US009424957B1

(12) United States Patent
Williams

(10) Patent No.: US 9,424,957 B1
(45) Date of Patent: Aug. 23, 2016

(54) SUBDERMAL LIGHTING APPARATUS WITH ENHANCED BIOLOGICAL COMPATIBILITY AND SAFETY

(71) Applicant: Luke Adam Williams, Melbourne (AU)

(72) Inventor: Luke Adam Williams, Melbourne (AU)

( * ) Notice: Subject to any disclaimer, the term of this patent is extended or adjusted under 35 U.S.C. 154(b) by 3 days.

(21) Appl. No.: 14/644,071

(22) Filed: Mar. 10, 2015

(51) Int. Cl.
*G01J 1/58* (2006.01)
*G21H 3/02* (2006.01)

(52) U.S. Cl.
CPC ....................................... *G21H 3/02* (2013.01)

(58) Field of Classification Search
CPC ............. G08B 13/04; F41G 1/32; F41G 1/01; F21S 8/00
See application file for complete search history.

(56) References Cited

U.S. PATENT DOCUMENTS 3,634,845 A * 1/1972 Colman ................. G08B 13/04 200/61.62
4,342,071 A * 7/1982 Chamberlain ............ F21S 8/00 362/158
4,855,879 A * 8/1989 Soltani .................... H01J 65/08 313/54
4,990,804 A * 2/1991 McNair ................... F21K 99/00 250/458.1
2007/0200074 A1 * 8/2007 Kohnen ................... C09D 5/22 250/462.1
2010/0088944 A1 * 4/2010 Callihan ................... F41G 1/32 42/145

OTHER PUBLICATIONS

Marc Lallanilla, 'Biohacker' Implants Chip in Arm, bioengineer.org, Nov. 5, 2013. URL> http://bioengineer.org/biohacker-implants-chip-arm/.

* cited by examiner

*Primary Examiner* — Kiho Kim
(74) *Attorney, Agent, or Firm* — Plager Schack LLP

(57) ABSTRACT

A subdermal lighting apparatus with enhanced operational longevity, safety and biological compatibility with a user is provided. The subdermal lighting apparatus includes a housing unit to store a radioactive isotope, a phosphor layer affixed to an interior surface of the housing unit to interact with radiation emitted by the radioactive isotope to generate visible light, a radiation shielding layer disposed around the housing unit and able to permit the generated visible light to pass through, and a biologically safe layer disposed around the radiation shielding layer able to permit the generated visible light to pass through. The biologically safe layer serves as a barrier between the radiation shielding layer and biological tissue of the user, thereby enhancing user safety of the apparatus.

7 Claims, 1 Drawing Sheet

SUBDERMAL LIGHTING APPARATUS WITH ENHANCED BIOLOGICAL COMPATIBILITY AND SAFETY

BACKGROUND

The embodiments herein relate generally to subdermal lighting apparatuses.

Subdermal lighting apparatuses implanted below the skin of individuals have several practical uses. Humans and most animals do not emit visible light, which can be problematic in dark or poorly lit conditions. Under these circumstances, it may be desirable for an individual to illuminate a portion of his/her body to aid others in locating the individual and/or providing others with social or emergency signals. Alternatively, these light emitting devices serve as a form of artistic expression to enable individuals to express their own style.

Several subdermal lighting devices exist, which comprise electrically powered light sources. However, these devices are limited because they have relatively short operational times and therefore require frequent recharges between uses. This is a burden and/or impractical for users. Several radiological lighting technologies such as gaseous tritium light sources ("GTLS") exist to provide reliable and long lasting visible light in applications such as watches, emergency exit signs and military equipment. However, these devices alone are not safe for use with humans or animals due to radiation concerns and incompatibilities with biological tissue.

As such, there is a need in the industry for a subdermal lighting apparatus that overcomes the limitations of the prior art. Specifically, there is a need for a subdermal lighting apparatus with enhanced operational times, compatibility with biological tissue and user safety.

SUMMARY

A subdermal lighting apparatus with enhanced operational longevity, safety and biological compatibility with a user is provided. The subdermal lighting apparatus comprises a housing unit configured to store a radioactive isotope, a phosphor layer affixed to an interior surface of the housing unit and configured to interact with radiation emitted by the radioactive isotope to generate visible light, a radiation shielding layer disposed around the housing unit and configured to enable the generated visible light to pass through, and a biologically safe layer disposed around the radiation shielding layer and configured to enable the generated visible light to pass through, wherein the biologically safe layer is configured to serve as a barrier between the radiation shielding layer and biological tissue of the user, thereby enhancing user safety of the apparatus.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
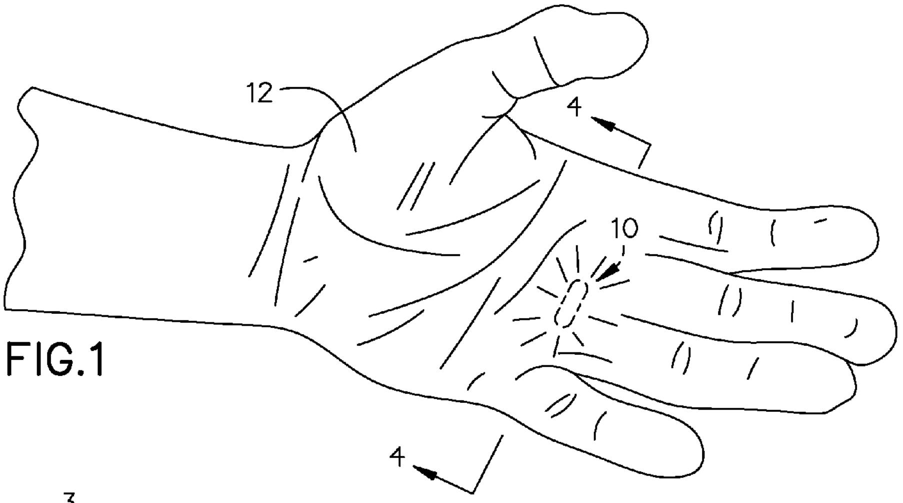
FIG. 1 depicts a perspective view of certain embodiments of the subdermal lighting apparatus shown in use.

As depicted in FIG. 1, subdermal lighting apparatus 10 is configured to be implanted beneath skin 12 of a user. The user is preferably a human, but may be any alternative animal. Although the figure depicts subdermal lighting apparatus 10 implanted within the hand of the user, it shall be appreciated that the apparatus may be implanted within any alternative portion of the user's body.

Figure 2:
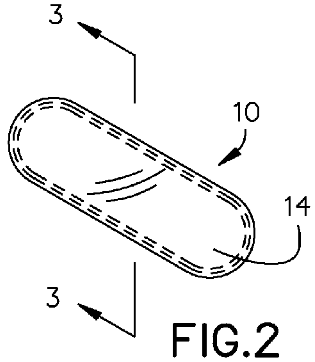
FIG. 2 depicts a perspective view of certain embodiments of the subdermal lighting apparatus.
Figure 3:
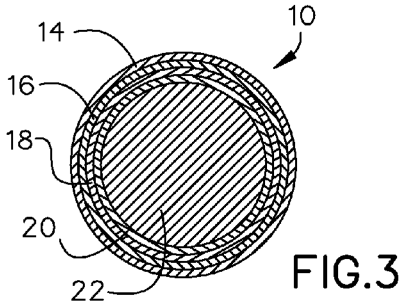
FIG. 3 depicts a section view of certain embodiments of the subdermal lighting apparatus taken along line 3-3 in FIG. 2.
Figure 4:
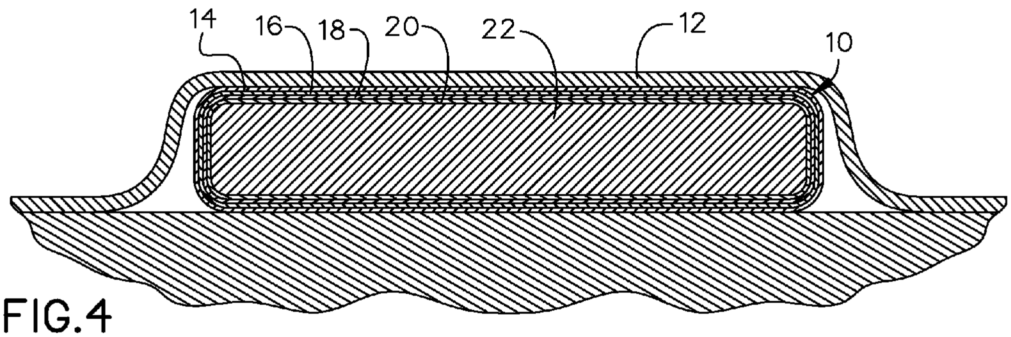
FIG. 4 depicts a section view of certain embodiments of the subdermal lighting apparatus taken along line 4-4 in FIG. 1.

As depicted in FIGS. 2-4, subdermal lighting apparatus 10 comprises biologically safe layer 14, radiation shielding layer 16, housing unit 18, phosphor layer 20 and radioactive isotope 22. Housing unit 18 is preferably made from borosilicate glass and has an approximate thickness of 0.1-0.2 millimeters, diameter of 2 millimeters and length of 10 millimeters. Housing unit 18 is configured to store and contain radioactive isotope 22. In a preferred embodiment, radioactive isotope 22 is tritium gas. However, any alternative radiological isotope may be used instead. Although housing unit 18 is depicted as a substantially cylindrical capsule, alternative shapes may be used instead.

Phosphor layer 20 is affixed to the interior surface of housing unit 18 and preferably comprises a thickness of 0.1 millimeters. Radiation shielding layer 16 is affixed to the outer surface of housing unit 18 and preferably is made from lead oxide glass with a thickness of approximately 0.35 millimeters or less. Since lead oxide glass is toxic to humans and animals, biologically safe layer 14 is disposed around radiation shielding layer 16. This serves as a barrier between radiation shielding layer 16 and biological tissue of the user once the subdermal lighting apparatus 10 is implanted beneath the user's skin. Biologically safe layer 14 is preferably 0.1-1.0 millimeters thick and made from borosilicate glass or bioglass. However, biologically safe layer 14 may be made from alternative known materials including, but not limited to, silicone, resins, or the like.

To manufacture subdermal lighting apparatus 10, housing unit 18 is created to have the desired shape by using known glass manufacturing techniques. An opening is created in housing unit 18 during the manufacturing process. The opening enables phosphor layer 20 to be applied to the interior surface of housing unit 18. Radioactive isotope 22 in the form of pressurized tritium gas is delivered through the opening of housing unit 18. It shall be appreciated that the pressure of the gas may be varied to alter the amount of visible light produced by subdermal lighting apparatus 10. Once completed, a carbon dioxide laser or similar device is used to fuse the borosilicate glass of housing unit 18 to seal the opening. Radiation shielding layer 16 is disposed around the outer surface of housing unit 18 by applying melted lead oxide glass thereon. The melted lead oxide glass hardens after it cools. Alternatively, radiation shielding layer 16 can be manufactured separately prior to being affixed to housing unit 18. Biologically safe layer 14 is disposed around radiation shielding layer 16 by applying melted borosilicate glass or bioglass thereon. The applied glass hardens after it cools. Any remaining openings in biologically safe layer 14 are sealed by fusing the glass to create an impermeable outer shell.

In operation, subdermal lighting apparatus 10 is implanted within the subcutaneous layer of a user beneath skin 12. The apparatus may be injected within a user by using a large needle or disposed within an incision in the skin created by a scalpel. Once subdermal lighting apparatus 10 is implanted within the user, skin 12 is sealed by sutures. During the time period of approximately one to four weeks after the implantation, the user's skin heals, which increases the amount of generated visible light that projects through skin 12. Radioactive isotope 22 interacts with phosphor layer 20, which converts radiation from the isotope into visible light. The materials of housing unit 18, radiation shielding layer 16 and biologically safe layer 14 enable the generated visible light to pass through and out of skin 12 of the user. Radiation shielding layer 16 prevents virtually all of the unsafe ionizing radiation produced by radioactive isotope 22 from being released into the user's body. Biologically safe layer 14 prevents biological tissue of the user from contacting the toxic lead oxide glass of radiation shielding layer 16. This enhances the safety and biological compatibility of subdermal lighting apparatus 10 with the user. The operational longevity of subdermal lighting apparatus 10 is enhanced because visible light can typically be generated for more than 10 years without any required maintenance.

It shall be appreciated that the components of subdermal lighting apparatus 10 described in several embodiments herein may comprise any alternative known materials in the field and be of any size and/or dimensions. It shall be appreciated that the components of subdermal lighting apparatus 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A subdermal lighting apparatus with enhanced operational longevity, safety and biological compatibility with a user, the subdermal lighting apparatus comprising:

a housing unit configured to store a radioactive isotope;

a phosphor layer affixed to an interior surface of the housing unit and configured to interact with radiation emitted by the radioactive isotope to generate visible light;

a radiation shielding layer disposed around the housing unit and configured to enable the generated visible light to pass through; and a biologically safe layer disposed around the radiation shielding layer and configured to enable the generated visible light to pass through, wherein the biologically safe layer is configured to serve as a barrier between the radiation shielding layer and biological tissue of the user, thereby enhancing user safety of the apparatus.

2. The subdermal lighting apparatus of claim 1, wherein the radioactive isotope is tritium.

3. The subdermal lighting apparatus of claim 2, wherein the housing unit is made from borosilicate glass.

4. The subdermal lighting apparatus of claim 3, wherein the radiation shielding layer is made from lead oxide glass.

5. The subdermal lighting apparatus of claim 4, wherein the lead oxide glass comprises a thickness of approximately 0.35 millimeters or less.

6. The subdermal lighting apparatus of claim 4, wherein the biologically safe layer is made from borosilicate glass.

7. The subdermal lighting apparatus of claim 6, wherein the borosilicate glass comprises a thickness of approximately 0.1-1.0 millimeters.

* * * * *